United States Patent [19]

Kress et al.

[11] Patent Number: 4,746,701

[45] Date of Patent: May 24, 1988

[54] THERMOPLASTICS MOULDING COMPOSITIONS BASED ON POLYSILOXANE/POLYCARBONATE BLOCK COPOLYMERS

[75] Inventors: Hans-Jürgen Kress; Winfried Paul, both of Krefeld; Horst Peters, Leverkusen; Jochen Schoeps, Krefeld; Karl-Heinz Ott, Leverkusen, all of Fed. Rep. of Germany

[73] Assignee: Bayer Aktiengesellschaft, Leverkusen, Fed. Rep. of Germany

[21] Appl. No.: 934,066

[22] Filed: Nov. 24, 1986

Related U.S. Application Data

[63] Continuation of Ser. No. 832,945, Feb. 26, 1986, abandoned.

[30] Foreign Application Priority Data

Feb. 26, 1985 [DE] Fed. Rep. of Germany ....... 3506655
Jun. 1, 1985 [DE] Fed. Rep. of Germany ....... 3519690

[51] Int. Cl.$^4$ ............................................... C08L 69/00
[52] U.S. Cl. .................................. 525/67; 264/331.13
[58] Field of Search ...................... 525/67; 264/331.13

[56] References Cited

U.S. PATENT DOCUMENTS

| | | | |
|---|---|---|---|
| 2,999,846 | 9/1961 | Schnell et al. | 260/49 |
| 3,271,367 | 9/1964 | Schnell et al. | 260/49 |
| 3,419,634 | 12/1968 | Vaughan | 260/824 |
| 3,525,712 | 8/1970 | Kramer | 260/47 |
| 3,544,514 | 12/1970 | Schnell et al. | 260/47 |
| 3,879,347 | 4/1975 | Serini et al. | 260/47 |
| 3,879,348 | 4/1975 | Serini et al. | 260/47 |
| 4,569,970 | 2/1986 | Paul et al. | 525/67 |

FOREIGN PATENT DOCUMENTS 3506472 2/1985 Fed. Rep. of Germany .

*Primary Examiner*—Melvyn I. Marquis
*Attorney, Agent, or Firm*—Gene Harsh; Joseph C. Gil; Aron Preis

[57] ABSTRACT

The present invention relates to thermoplastic moulding compositions containing (A) 20 to 80 parts by weight of a polydiorganosiloxane/polycarbonate block copolymer, (B) 70 to 5 parts by weight of a graft polymer in particle form and (C) 5 to 60 parts by weight of a rubber-free, thermoplastic vinyl polymer, the total of parts by weight of components (A)+(B)+(C) being in each case 100 parts by weight, and, if appropriate, other known additives.

9 Claims, No Drawings

THERMOPLASTICS MOULDING COMPOSITIONS BASED ON POLYSILOXANE/POLYCARBONATE BLOCK COPOLYMERS

This application is a continuation, of application Ser. No. 832,945 filed Feb. 26, 1986, now abandoned.

The present invention relates to thermoplastic moulding compositions containing (A) 20 to 80 parts by weight of a polydiorganosiloxane/polycarbonate block copolymer with average molecular weights $M_w$ of 10,000 to 30,000, preferably 15,000 to 25,000 ($M_w$ determined in a known manner by ultracentrifugation or measurement of scattered light) and with a content of poly(diorganosiloxane) structural units of between 10% by weight and 0.5% by weight, preferably between 7% by weight and 1% by weight, in each case based on the total weight of the block copolymer, the block copolymers being prepared starting from polydiorganosiloxanes which contain α,ω-bishydroxyaryloxy end groups and have a degree of polymerisation $P_n$ of between 5 and 100, preferably between 20 and 80, chain stoppers also being used, (B) 70 to 5 parts by weight of a graft polymer, in particle form, of ethylenically unsaturated monomers on rubbers from the series comprising diene monomer, alkyl acrylate and EPDM rubbers and (C) 5 to 60 parts by weight of a rubber-free, thermoplastic vinyl monomer polymer, the total of parts by weight of components (A)+(B)+(C) being in each case 100 parts by weight, which are characterised in that component (A) is prepared by the phase boundary process using monoalkylphenols or dialkylphenols with a total of 8 to 20 C atoms in the alkyl substituents, preferably phenols of the formula (III),

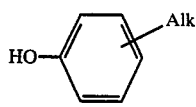

wherein

Alk represents a linear or branched alkyl radical with 8 to 15 C atoms, as chain stoppers The polydiorganosiloxane/polycarbonate block copolymers according to component (A) and their preparation are the subject of German Patent Application P 3 506 472.2 which has been filed by the Applicant Company (Le A 23 654), from which the following statements have been taken:

According to German Patent Application P 3 506 472.2 (Le A 23 654), thermoplastic poly(diorganosiloxane)/polycarbonate block copolymers with average molecular weights Mw (weight-average) of about 10,000 to 30,000, preferably about 15,000 to 25,000 (determined in a known manner by ultracentrifugation or measurement of scattered light) and with a content of poly(diorganosiloxane) structural units of between 10% by weight and 0.5% by weight, preferably between 7% by weight and 1% by weight, in each case based on the total weight of the block copolymer, the poly(diorganosiloxane) structures having a degree of polymerisation of between 5 and 100, preferably between 20 and 80, are prepared from (a) α,ω-bis-hydroxyaryloxy-polydiorgano siloxanes with degrees of polymerisation of between 5 and 100, preferably between 20 and 80, preferably those of the formula (I), (b) other diphenols, preferably of the formula (II), (c) chain stoppers and, if appropriate, (d) branching agents, with phosgene by the known methods of the two-phase boundary process, monoalkylphenols or di-alkylphenols with a total of 8 to 20 C atoms in the alkyl substituents, preferably those of the formula (III)

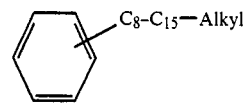

being employed as chain stoppers in sufficient amounts, preferably in amounts of 1.0 mol % to 10 mol %, based on the diphenols employed as component (b), reaction of the phenolic components being quantitative.

This German Patent Application P 3 506 472.2 (Le A 23 654) also relates to the block copolymers which contain monoalkylphenyl or dialkylphenyl end groups and are obtainable by this process.

These products have improved mould release properties and flow properties and a tough/brittle transition which is shifted towards lower temperatures.

α,ω-Bishydroxy-aryloxy-polydiorganosiloxanes of component (a) which are to be employed according to this German Patent Application P 3 506 472.2 (Le A 23 654) are known, for example, from U.S. Pat. No. 3,419,634.

Polydiorganosiloxanes which contain α,ω-bis-hydroxyaryloxy end groups and are preferably to be employed are those of the formula (I)

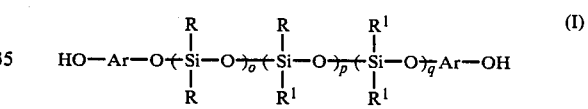

wherein the radicals Ar are identical or different arylene radicals from diphenols with preferably 6 to 30 C atoms, R and $R^1$ are identical or different and denote linear alkyl, branched alkyl, halogenated linear alkyl, halogenated branched alkyl, aryl or halogenated aryl, but preferably methyl, and the number of the diorganosiloxy units n=o+p+q=5 to 100, preferably 20 to 80.

Alkyl in the above formula (I) is, for example, $C_1$-$C_{20}$-alkyl; aryl in the above formula (I) is $C_6$-$C_{14}$-aryl. In the above formula I, halogenated denotes partly or chlorinated, brominated or fluorinated. Examples of alkyl, aryl, halogenated alkyl and halogenated aryl radicals are methyl, ethyl, propyl, n-butyl, tert.-butyl, phenyl, naphthyl, chloromethyl and trifluoropropyl.

Diphenols which are to be employed for the preparation of the α,ω-bis-hydroxy-aryloxypolydiorganosiloxanes of component (a), preferably of the formula (I), which are to be employed according to the invention are: hydroquinone, resorcinol, dihydroxydiphenyls, bis-(hydroxyphenyl)alkanes, bis-(hydroxyphenyl)-cycloalkanes, bis-(hydroxyphenyl) sulphides, bis-(hydroxyphenyl) ethers, bishydroxyphenyl) sulphoxides, bis-(hydroxyphenyl) sulphones and α,αbis-(hydroxyphenyl)-diisopropylbenzenes, and nuclear-alkylated and nuclear-halogenated compounds thereof These and other suitable aromatic dihydroxy compounds are listed, for example, in U.S. Pat. No. 3,271,367 and 2,999,846 and in German Offenlegungsschriften (German Published Specifications) 2,063,050 and 2,211,957.

Diphenols which are preferably suitable for the preparation of the α,ω-bishydroxy-aryloxy-diorganosiloxanes of component (a) are those of the formula (II)

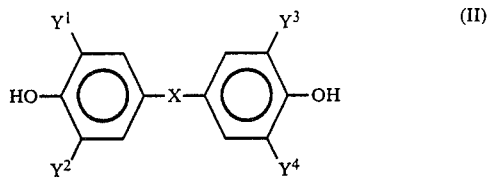

wherein
X denotes a single bond, —CH₂—,

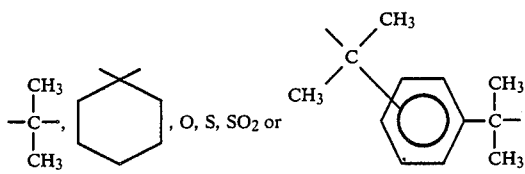

$Y^1$ to $Y^4$ are identical or different and denote hydrogen, C1-C4-alkyl, preferably methyl, or halogen, preferably chlorine or bromine.

Examples of preferred diphenols are 2,2-bis-(4-hydroxyphenyl)-propane, 1,1-bis-(4-hydroxyphenyl)-cyclohexane, 2,2-bis-(3,5-dichloro-4-hydroxyphenyl)-propane, 2,2-bis-(3,5-dibromo-4-hydroxyphenyl)-propane, 2,2-bis(3,5-dimethyl-4-hydroxyphenyl)-propane, bis-(3,5-dimethyl-4-hydroxyphenyl)-methane and bis-(4-hydroxyphenyl) sulphide.

Other diphenols of component (b) which can be employed according to German Patent Application P 3 506 472.2 (Le A 23 654) are those mentioned above, those mentioned as preferred again corresponding to the formula (II).

Monoalkylphenols and dialkylphenols which are suitable according to German Patent Application P 3 506 472.2 (Le A 23 654) can contain linear alkyl radicals and branched alkyl radicals. Examples of the chain stoppers of component (c) which can be used according to the invention are p-isooctylphenol, p-nonylphenol, 3,5-di-tert.-butyl-phenol, p-tert.-octylphenol, p-dodecylphenol, 2-(3,5-dimethyl-heptyl)-phenol and 4-(3,5-dimethyl-heptyl)-phenol.

Instead of the monoalkylphenols or dialkylphenols, it is also possible to employ their halogenocarbonic acid esters.

Branching agents of component (d) which can be employed are those with three or more than three functional groups, in particular those with three or more than three phenolic hydroxyl groups, and the amounts usually known for branching agents are between 0.05 and 2 mol %, based on the diphenols of component (b), should be observed. The preparation of branched polycarbonates is described, for example, in DT-OS (German Published Specification) 1,570,533 and DT-OS (German Published Specification) 1,595,762 and in U.S. Pat. No. 3,544,514.

Examples of some of the compounds which have three or more than three phenolic hydroxyl groups and which can be used are 2,4-bis-(4-hydroxyphenyl-isopropyl)-phenol, 2,6-bis-(2'hydroxy-5'-methyl-benzyl)-4-methylphenol, 2-(4-hydroxyphenyl)-2-(2,4-dihydroxyphenyl)-propane and 1,4-bis-(4,4'-dihydroxytriphenylmethyl)-benzene. Some of the other trifunctional compounds are 2,4-dihydroxybenzoic acid, trimesic acid, cyanuric chloride and 3,3-bis-(4-hydroxyphenyl)-2-oxo-2,3-dihydroindole, as well as 3,3-bis-(4-hydroxy-3-methyl-phenyl)-2-oxo-2,3-dihydroindole.

The polydiorganosiloxanes containing α,ω-bishydroxyaryloxy end groups and the chain stoppers can be added in the two-phase boundary process together with the other diphenols of component (b) before the introduction of phosgene, or separately during or after the introduction of phosgene, but in any case before the addition of the polycondensation catalyst.

Suitable organic solvents for the two-phase boundary process are those known for thermoplastic polycarbonates, such as, for example, methylene chloride or chlorobenzene.

Suitable basic compounds for the formation of the aqueous alkaline phase are solutions of LiOH, NaOH, KOH, Ca(OH)₂ and/or Ba(OH)₂ in water.

Suitable catalysts for the polycondensation by the two-phase boundary process are the tertiary aliphatic amine catalysts known for polycarbonate synthesis, such as trimethylamine, triethylamine, n-tripropylamine, n-tributylamine or N-ethylpiperidine; if appropriate, the known quaternary ammonium salts, such as, for example, tetrabutylammonium bromide, can also be employed.

The amount of catalyst for the two-phase phase boundary process varies, depending on the diphenol employed, between 0.2 and 5 mol %, or between 5 and 10 mol % if tetramethyl-substituted diphenols are employed, in each case based on the total amount of the diphenols of component (b) employed.

The amounts of organic phase are preferably chosen so that the two-phase boundary polycondensation is carried out in a 5 to 20% strength organic solution, preferably 10 to 15% strength organic solution.

In the preparation by the two-phase boundary process, the amounts of aqueous-alkaline phase in terms of volume are preferably the same as the amount of the total organic phase. They can also be of greater or smaller volume than the total amounts of the organic phase.

The pH value of the aqueous phase during the reaction is between pH 9 and 14, preferably between pH 12 and 13.

The particular reactant ratios to be employed between the other diphenol of component (b) and the polydiorganosiloxane of component (a) containing hydroxy-aryloxy end groups depend on the content of poly(diorganosiloxane) units to be achieved in the block copolymers to be prepared according to the invention, reaction of the reactants usually being quantitative.

Carbonic acid halides, in particular carbonic acid chlorides, such as, for example, phosgene or COBr₂, or bischlorocarbonic acid esters of diphenols are used in a known manner in a corresponding amount as carbonate donors for the preparation by the two-phase boundary process, in each case less than ½ mole of diphenol being used per halogeno-carbonic acid group.

The aromatic thermoplastic block copolymers can be isolated by the methods known from polycarbonate synthesis by the two-phase boundary process. In these methods, the organic phase containing the dissolved copolycarbonate is separated off and washed and the copolycarbonate is then isolated by evaporating the solution, a devolatilisation extruder preferably being used as the final stage of the working up process.

The customary additives can be added to the resulting block copolymers before, during or after their preparation. In this connection, there may be mentioned, for example, dyestuffs, pigments, stabilisers against the effect of moisture, heat and UV and fillers, such as glass powder, quartz products, graphite, molybdenum sulphide, metal powders and glass fibres.

Example according to German Patent Application P 3 506 472.2 (Le A 23 654)

The siloxane content, i.e. the content of dimethylsiloxane units in % by weight, based on the total weight of the block copolymer, was determined by nuclear magnetic resonance spectrometry. The degree of polymerisation n obtained by determination of the end groups on the polysiloxane starting material is given as the average siloxane block length.

The relative solution viscosity was measured at 25° C. and at a concentration of 5 g/1 in methylene chloride.

The Izod notched impact strength was determined on test pieces 3.2 mm or 6.4 mm wide in accordance with ASTM 256-56.

The heat distortion point was determined by the Vicat method (VST/B/120) in accordance with DIN 53 460/$^{ISO}$ 368.

The mould release force was determined on a shell mould.

1. Preparation of a polydimethylsiloxane with bisphenol A end groups 19.2 parts by weight of bisphenol A and 1,800 parts by weight of chlorobenzene are introduced into a vessel provided with a condenser, thermometer, dropping funnel and stirrer. The mixture is warmed to 100° C. and 11.6 parts by weight of potassium carbonate are added. A solution of 178 parts by weight of $\alpha,\omega$-bisacetoxypolydimethylsiloxane, $P_n=84$, in 178 parts by weight of chlorobenzene is then added to the mixture under reflux over a period of 15 minutes, stirring being continued for a further two hours. The mixture is cooled to about 80° C. and filtered while still hot.

2. Preparation of a polydimethylsiloxane/polycarbonate block copolymer 3,035 parts by weight of bisphenol A, 3,024 parts by weight of sodium hydroxide, 34,700 parts by weight of water, 17,800 parts by weight of methylene chloride, 13,100 parts by weight of chlorobenzene and 164.7 parts by weight of 4-(1,1,3,3-tetramethylbutyl)-phenol are added to the solution, described under 1, of a polydimethylsiloxane with bisphenol A end groups in a reaction flask equipped with a stirrer, phosgene inlet tube, reflux condenser, internal thermometer and dropping funnel. 2,216 parts by weight of phosgene are passed in at room temperature, the pH being kept between 12 and 13 by addition of 45% strength sodium hydroxide solution. The introduction takes about one hour. Thereafter, 11 parts by weight of triethylamine are added and the mixture is subsequently stirred at pH 12 to 13 for a further 45 minutes. The co-condensate is worked up by the methods customary for polycarbonate.

| Properties | Example |
|---|---|
| Relative solution viscosity | 1.200 |
| Siloxane content (%) | 5.3 |
| Siloxane block length (n) | 84 |
| Melt viscosity at 300° C./10³ s⁻¹ | |

| Properties | Example |
|---|---|
| Pa.s | 113 |
| Notched impact strength according to Izod (3.2 mm) | |
| room temperature J/m | 557* (*tough fracture) |
| −40° C. J/m | 381* |
| critical temperature °C. | less than −40 |
| Notched impact strength according to Izod (6.4 mm) | |
| room temperature J/m | 391* |
| 0° C. J/m | 7 × 355*/3 × 320 |
| critical temperature °C. | 0 |
| Vicat heat distortion point (VST/B/120) °C. | 141 |
| Mould release force at 136° C. | |
| mould temperature/300° C. material temperature bar | 5 |

Component (A) can also consist of a mixture of polydiorganosiloxane/polycarbonate block copolymers with other polysiloxane-free thermoplastic polycarbonates, the weight-average molecular weights $M_w$ of which in each case are again from 10,000 to 30,000, preferably from 15,000 to 25,000 ($M_w$ determined in a known manner by ultracentrifugation or measurement of scattered light), and the content of polydiorganosiloxane structural units in the polycarbonate mixture again being between 10% by weight and 0.5% by weight, preferably between 7% by weight and 1% by weight, in each case based on the total weight of the polycarbonate mixture, and all the polycarbonates of the mixture again having monoalkylphenyl or dialkylphenyl end groups with a total of 8 to 20 C atoms in the alkyl substituents, preferably monophenyl end groups of the formula (IIIa)

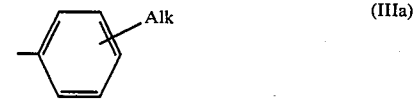

wherein

Alk is a linear or branched alkyl radical with 8 to 15 C atoms.

Those polydiorganosiloxane/polycarbonate block copolymers in which the content of poly(diorganosiloxane) structural units is greater than 10% by weight, preferably 40% by weight to 60% by weight, and in which the $M_w$ can be between 15,000 and 60,000, are also suitable for the preparation of such polycarbonate mixtures.

Such polydiorganosiloxane/polycarbonate block copolymers are prepared by a process analogous to the preparation of those block copolymers with contents of 10% by weight to 0.5% by weight of poly(diorganosiloxane) structural units according to the above-mentioned German Patent Application P 3 506 472.2 of the Applicant Company (Le A 23 654).

Graft polymers (B) in the context of the invention are those in which either a monomer from the series comprising styrene and methyl methacrylate or a monomer mixture of 95–50% by weight of styrene, $\alpha$-methylstyrene, nuclear-substituted styrene, methyl methacrylate or mixtures thereof and 5–50% by weight of acrylonitrile, methyl methacrylate, maleic anhydride, N-substituted maleimides or mixtures thereof, is grafted onto a rubber by polymerisation. Suitable rubbers are, in particular, polybutadiene, butadiene/styrene copolymers with up to 30% by weight of copolymerised styrene, copolymers of butadiene and acrylonitrile with up to 20% by weight of acrylonitrile or copolymers of butadiene with up to 20% by weight of a lower alkyl ester of acrylic or methacrylic acid (for example methyl acrylate, ethyl acrylate, methyl methacrylate and ethyl methacrylate).

Examples of other suitable rubbers are polyisoprene or polychloroprene. Alkyl acrylate rubbers based on $C_1$-$C_8$-alkyl acrylates, in particular ethyl, butyl and ethylhexyl acrylate, are furthermore suitable. These alkyl acrylate rubbers can optionally contain up to 30% by weight of copolymerised monomers, such as vinyl acetate, acrylonitrile, styrene, methyl methacrylate and vinyl ether.

These alkyl acrylate rubbers can furthermore contain relatively small amounts (up to 5% by weight) of ethylenically unsaturated monomers with a crosslinking action. These are, for example, alkylene dioldi(meth)acrylates, polyester di-(meth)-acrylates, di- and trivinylbenzene, triallyl cyanurate, ally(meth)acrylate, butadiene, isoprene and the like. Such alkyl acrylates are known. Acrylate rubbers as the graft base can also be products which contain, as the core a crosslinked diene rubber of one or more conjugated dienes, such as polybutadiene, or a copolymer of a conjugated diene with an ethylenically unsaturated monomer, such as styrene and/or acrylonitrile. Examples of other suitable rubbers are EPDM rubbers, that is to say rubbers of ethylene, propylene and a non-conjugated diene monomer.

Diene monomer rubbers or alkyl acrylate rubbers are preferred.

The graft copolymers (B) contain 5-80% by weight, in particular 20-70% by weight, of rubber and 95-20% by weight, in particular 80-30% by weight, of monomers copolymerised by grafting. In these graft copolymers, the rubbers are in the form of at least partly crosslinked particles with an average particle size of 0.09 to 5 $\mu$m, in particular 0.1 to 1 $\mu$m. Such graft copolymers are prepared by free radical graft copolymerisation of monomers from the series comprising styrene, $\alpha$-methylstyrene, acrylonitrile, methyl methacrylate, nuclear-substituted styrene and maleic anhydride in the presence of the rubbers to be grafted, and are all known. Preferred preparation processes for such graft copolymers are emulsion, solution, bulk or suspension polymerisation.

So-called ABS polymers are particularly preferred.

The rubber-free vinyl monomer polymers (C) can be built up from the grafting monomers or similar monomers, in particular from at least one monomer from the series comprising styrene, $\alpha$-methylstyrene, halogenostyrene and nuclear-alkylated styrene, and one monomer from the series comprising acrylonitrile, methacrylonitrile, methyl methacrylate, maleic anhydride, vinyl acetate and N-substituted maleimide. They are preferably copolymers of 95-50% by weight of styrene, $\alpha$-methylstyrene, methyl methacrylate or mixtures thereof and 5-50% by weight of acrylonitrile, methacrylonitrile, methyl methacrylate, maleic anhydride, N-substituted maleimide or mixtures thereof.

Such copolymers are frequently formed during grafting copolymerisation as by-products, especially if large amounts of monomer are grafted onto small amounts of rubber.

The amount of copolymer (C) to be employed according to the invention of 5-60 parts by weight per 100 parts by weight of (A)+(B)+(C) does not include these by-products of the grafting polymerisation.

Such copolymers prepared separately are resinous, thermoplastic and rubber-free; they are, in particular, copolymers of styrene and/or $\alpha$-methylstyrene and acrylonitrile, if appropriate mixed with methyl methacrylate.

Particularly preferred copolymers consist of 20-40% by weight of acrylonitrile and 80-60% by weight of styrene or $\alpha$-methylstyrene. Such copolymer compositions are known and can be prepared, in particular, by free radical polymerisation processes, in particular by emulsion, suspension, solution or bulk polymerisation. The copolymers preferably have molecular weights of 15,000 to $2 \times 10^5$.

Thermoplastic mixtures of a polycarbonate based on aromatic dihydroxy compounds and ABS polymers are known in principle (German Patent Specification) 1,170,141 and DE-AS (German Published Specification) 1,810,993). Mixtures of aromatic polycarbonates with particular ABS systems are described in DE-AS (German Published Specification) 2,259,565, DE-OS (German Published Specification) 2,329,548 and DE-OS (German Published Specification) 2,329,546.

Very high technological requirements are imposed on such mixtures. In particular, a high toughness, above all at low temperatures, and as high as possible a heat distortion point are required here. In addition, the best possible flow properties are desirable for the production of complicated or very large mouldings. Such a combination of properties cannot be achieved, or can be achieved only with the loss of individual important product properties, using the polycarbonate moulding compositions known according to the prior art.

It was therefore surprising that it was already possible to achieve this improved overall pattern of properties by using a modified polycarbonate. At the same time, it was surprising that, in spite of the Si block, moulding compositions with good properties were obtained by mixing the polycarbonate modified by a diorganosiloxane block with ABS polymers.

The addition of organopolysiloxane/polycarbonate polymers as components which improve the impact strength to mixtures of an aromatic polycarbonate and a polystyrene resin is known according to DE-OS (German Published Specification) 2,434,085, the organopolysiloxane/polycarbonate polymers being those of U.S. Pat. No. 3,189,662.

Organosiloxane/polycarbonate polymers according to U.S. Pat. No. 3,189,662 differ from the polydiorganosiloxane/polycarbonate block copolymers according to the invention in that they are prepared by phosgenation up to the maximum viscosity.

There should be still mentioned that the polydiorganosiloxane/polycarbonate block copolymers, known in the relevant literature, are characterized by their improved mechanical properties at low temperatures (see for example B. M. Beach, R. P. Kambour and A. R. Schultz. J. Polym. Sci., Polym. Lett. Ed. 12, 247 (1974).

The present invention relates to thermoplastic moulding compositions based on organopolysiloxane/polycarbonate block copolymers in combination with graft polymers, in the form of particles, of ethylenically unsaturated monomers on rubber and rubber-free thermoplastic vinyl polymers which have very good flow properties coupled with a high toughness when exposed to impact (notched impact strength), in particular also at low temperatures, and have an excellent heat distortion point.

The moulding compositions according to the invention can contain other known additives, such as stabilisers, pigments, flameproofing agents, mould release agents and/or antistatics.

The moulding compositions according to the invention, consisting of components (A), (B), (C) and, if appropriate, other known additives, such as stabilisers, pigments, flameproofing agents, mould release agents and/or antistatics, are prepared by mixing the particular constituents in a known manner and subjecting the mixture to melt compounding or melt extrusion at temperatures of 200° C. to 330° C. in the usual units, such as internal kneaders, extruders or twin-screw extruders.

The present invention thus also relates to a process for the preparation of thermoplastic moulding compositions consisting of components (A), (B) and (C) and, if appropriate, stabilisers, pigments, flameproofing agents, mould release agents and/or antistatics, which is characterised in that components (A), (B) and (C) and, if appropriate, stabilisers, pigments, flameproofing agents, mould release agents and/or antistatics are subjected, after being mixed, to melt compounding or melt extrusion at temperatures of 200° C. to 330° C. in the customary units.

The individual constituents can be mixed in a known manner either successively or simultaneously, and in particular either at 20° C. (room temperature) or at elevated temperature.

The moulding compositions of the present invention can be used for the production of all types of shaped articles. In particular, shaped articles can be produced by injection moulding. Examples of shaped articles which can be produced are: housing components of all types (for example for domestic appliances, such as juice presses, coffee machines and mixers) or covering plates for the construction sector and components for the automobile sector. They are also employed in the field of electrical engineering, because they have very good electrical properties.

Another type of processing is the production of shaped articles by deep-drawing from previously produced sheets of films.

Particle size always denotes average particle diameter $d_{50}$, determined by ultracentrifuge measurements in accordance with the method of W. Scholtan et al., Kolloid-Z und Z. Polymere 250 (1972) 782–796.

The siloxane content, i.e. the content of dimethylsiloxy units in % by weight, based on the total weight of the block copolymer, was determined gravimetrically and by nuclear magnetic resonance spectrometry. The degree of polymerisation $P_n$ obtained by determination of the end groups on the siloxane prepolymer is given as the average siloxane block length.

EXAMPLES

Polycondensates and polymers employed:

(A.1.) Copolycarbonate based on bisphenol A and 5% by weight of polydimethylsiloxane of block length $(P_n)$ 84, with a relative solution viscosity of 1.202, measured in $CH_2Cl_2$ at 25° C. and at a concentration of 0.5% by weight, prepared using isooctylphenol as a chain stopper and prepared according to German Patent Application P 3 506 472.2 (Le A 23 654) loc. cit.

(A.2.) Copolycarbonate based on bisphenol A and 5% by weight of polydimethylsiloxane of block length $(P_n)$ 84, with a relative solution viscosity of 1.246, measured in $CH_2Cl_2$ at 25° C. and at a concentration of 0.5% by weight, prepared using isooctylphenol as the chain stopper in accordance with German Patent Application P 3 506 472.2 (Le A 23 654) loc. cit.

(A.3.) A copolycarbonate based on bisphenol A and 5% by weight of polydimethylsiloxane of block length $(P_n)$ 40, with a relative solution viscosity of 1.31, measured in $CH_2Cl_2$ at 25° C. and at a concentration of 0.5% by weight, prepared using phenol as a chain stopper and prepared according to DE-OS (German Published Specification) 3,334,782 (Le A 22 594).

(A.4.) Homopolycarbonate based on bisohenol A with a relative solution v:scosity of 1.20, measured in $CH_2Cl_2$ at 25° C. and at a concentration of 0.5% by weight, prepared using isoctylohenol as the chain stopper.

(A.5.) Homopolycarbonate based on bisphenol A with a relative solution viscosity of 1.25, measured in $CH_2Cl_2$ at 25° C. and at a concentration of 0.5% by weight, prepared using isooctylphenol as the chain stopper.

(B.) SAN graft polymer of 50% by weight of a styrene/acrylonitrile mixture (in a weight ratio of 72:28) on 50% of polybutadiene in particle form with an average particle size $(d_{50})$ of 0.4 Hm, obtained by emulsion polymerisation.

(C.) Styrene/acrylonitrile copolymer with a styrene/acrylonitrile ratio of 72:28 and a limiting viscosity of $[\eta]=0.55$ dl/g (measurement in dimethylformamide at 20° C.)

All the samples contain 0.25 part by weight of pentaerythritol tetrastearate per 100 parts by weight of the sum of (A)+(B)+(C), as a mould release agent.

The moulding compositions according to the invention and the comparison materials were prepared by melt compounding in an internal kneader (capacity 1.3 l) at a temperature of 200°–220° C.

The shaped articles were produced by injection moulding at 260° C.

The heat distortion point according to Vicat (method B) was determined in accordance with DIN 53 460.

The notched impact strength according to Izod was determined on bars of dimensions $2.5 \times \frac{1}{2} \times \frac{1}{8}$ in accordance with ASTM-D-256.

The flow properties were determined by injection moulding of a spiral about 8 mm wide and about 2 mm thick at a material temperature of 260° C. The length of the spiral in cm represents a measure of the flow properties.

The flow properties were furthermore evaluated via the filling pressure required in the injection moulding machine (material temperature: 260° C.) (see: Johannaber, Kunststoffe 74 (1984), 1; pages 1–5) to produce bars of dimensions $2.5'' \times \frac{1}{2}'' \times \frac{1}{8}''$.

The composition of the moulding compositions and the particular test data are shown in the following table.

|  | experiments according to the invention | | | comparison experiments | | |
|---|---|---|---|---|---|---|
| A1 (parts by weight) | 60 | 60 | | | | |
| A2 (parts by weight) | | | 60 | 60 | | |
| A3 (parts by weight) | | | | | 60 | 60 |

-continued

| experiments according to the invention | | | | | | comparison experiments | | |
|---|---|---|---|---|---|---|---|---|
| A4 (parts by weight) | | | | | | 60 | | |
| A5 (parts by weight) | | | | | | | 60 | 60 |
| B (parts by weight) | 24 | 16 | 24 | 16 | 24 | 16 | 24 | 16 |
| C (parts by weight) | 16 | 24 | 16 | 24 | 16 | 24 | 16 | 16 | 24 |
| Notched impact strength according to Izod | | | | | | | | |
| at room temperature (J/m) | 449 | 450 | 551 | 582 | 619 | 831 | 428 | 519 | 537 |
| at −20° C. (J/m) | 362 | 338 | 488 | 467 | 602 | 781 | 234 | 462 | 329 |
| at −30° C. (J/m) | 317 | 289 | — | 413 | — | 690 | — | 429 | — |
| at −40° C. (J/m) | 204 | 148 | 388 | 298 | 490 | 272 | — | 252 | — |
| Heat distortion point according to Vicat −B (°C.) | 116 | 117 | 118 | 117 | 119 | 119 | 120 | 122 | 120 |
| Flow properties | | | | | | | | |
| (a) length of spiral (cm) | 49 | 53 | 41 | 41 | 38 | 44 | 48 | 40 | 46 |
| (b) (filling pressure 260° C.) (bar) | 93 | 85 | 117 | 100 | 134 | 110 | 90 | 123 | 107 |

All the samples contain 0.25 part by weight of pentaerythritol tetrastearate per 100 parts by weight of (A.) + (B.) + (C.), as a mould release agent As the above table shows, very good flow properties are achieved by using the polysiloxane/polycarbonate block copolymers according to the invention. The moulding compositions according to the invention are also distinguished by substantially better toughness properties at low temperatures in comparison with products based on pure bisphenol A polycarbonate.

We claim:
1. A thermoplastic molding composition comprising
(A) 20 to 80 parts by weight of a poly(diorganosiloxane)/polycarbonate block copolymer,
(B) 70 to 5 parts by weight of a graft polymer having a graft base selected from the group consisting of EPDM rubber, alkylacrylate rubber, and a rubber polymerized from a diene monomer and a grafted phase derived from an ethylenically unsaturated monomer, and
(C) 5 to 600 parts by weight of a rubber free thermoplastic polymer or copolymer derived from at least one vinyl monomer, wherein the sum of A+B+C+ is 100 and wherein said A is characterized in that its weight average molecular weight, determined by ultracentrifugation or by scattered light is 10,000 to 30,000 and in that its content of said poly(diorganosiloxane) structural units is between 0.5 and 10 percent relative to its weight and in that its degree of polymerization is between 5 and 100 and is further characterized in that it is prepared in the two phase boundary process using polyorganosiloxane which contains $\alpha\omega$-bishydroxyaryloxy end groups and a chain stopper selected from the group consisting of a monoalkylphenol and a halogenocarbonic acid ester of a monoalkylphenol, a dialkylphenol, and a halogenocarbonic acid ester of a dialkylphenol said alkyl substituents having 8 to 20 carbon atoms.

2. The molding composition of claim 1 wherein said chain stopper conforms to

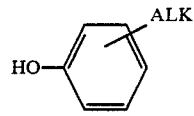

wherein ALK is a linear or branched $C_8$–$C_{15}$ alkyl radical.

3. The molding composition of claim 1 wherein said (A) further comprise a siloxane free thermoplastic polycarbonate.

4. The molding composition of claim 1 wherein said weight average molecular weight is 15,000 to 25,000.

5. The molding composition of claim 1 wherein said content of poly(diorganosiloxane) structural units is between 7 and 1 percent by weight.

6. The molding composition of claim 1 further comprising at least one member selected from the group consisting of a pigment, a flame proofing agent, a mold release agent and an antistatic agent.

7. A process for the production of the molding composition of claim 1, in which components (A), (B) and (C) are subjected, after being mixed, to melt compounding or melt extrusion at a temperature of 200° C. to 330° C. in a unit for such compounding or extrusion.

8. The process of claim 7 wherein at least one member selected from the group consisting of a pigment, a flame proofing agent, a mold release agent and an antistatic agent is included during mixing.

9. A molding composition prepared by the process of claim 7.

* * * * *